Figure 1:
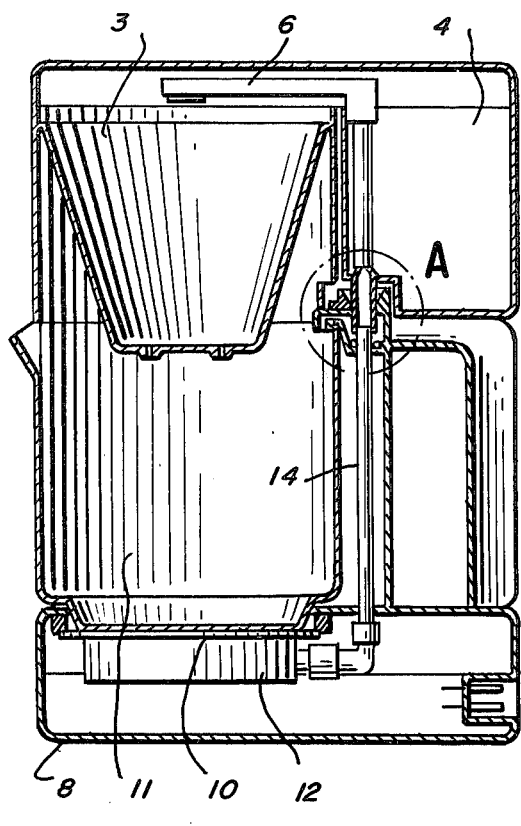

United States Patent [19]

Rickert

[11] 4,155,292
[45] May 22, 1979

[54] FILTER COFFEE MACHINE

[75] Inventor: Helmut Rickert, Mainflingen, Fed. Rep. of Germany

[73] Assignee: Rowenta-Werke, GmbH, Fed. Rep. of Germany

[21] Appl. No.: 678,843

[22] Filed: Apr. 21, 1976

[30] Foreign Application Priority Data

Apr. 24, 1975 [DE] Fed. Rep. of Germany ....... 2518130

[51] Int. Cl.² .................. A47J 31/057; A23F 1/08
[52] U.S. Cl. .................................... 99/306; 99/307
[58] Field of Search ............... 99/281, 282, 283, 284, 99/288, 290, 292, 295, 304, 296, 297, 305–315; 141/349; 222/162; 251/290, 291, 298, 299, 300, 303

[56] References Cited

U.S. PATENT DOCUMENTS

| | | |
|---|---|---|
| 2,246,061 | 6/1941 | Nowland ........................ 99/281 X |
| 2,503,031 | 4/1950 | Davidson ....................... 251/303 X |
| 2,513,594 | 7/1950 | Snyder ............................ 99/284 X |
| 2,577,985 | 12/1951 | Willman ......................... 99/281 X |
| 2,636,518 | 4/1953 | Strebel .......................... 251/303 X |
| 2,829,583 | 4/1958 | Leonard ............................ 99/282 |
| 2,846,938 | 8/1958 | Brandl .............................. 99/281 |
| 3,182,584 | 5/1965 | Serio ................................ 99/284 |
| 3,316,388 | 4/1967 | Wickenberger et al. .......... 99/281 X |
| 3,589,271 | 6/1971 | Tarrant et al. ..................... 99/280 |
| 3,605,604 | 9/1971 | Diebolb et al. .................... 99/281 |
| 3,902,408 | 9/1975 | Fuhner ............................... 99/307 |
| 3,908,530 | 9/1975 | Simon ................................ 99/307 |

FOREIGN PATENT DOCUMENTS

| | | |
|---|---|---|
| 411273 | 11/1966 | Fed. Rep. of Germany ............ 99/307 |
| 367005 | 10/1906 | France ............................ 99/307 |

*Primary Examiner*—Harvey C. Hornsby
*Assistant Examiner*—Timothy F. Simone
*Attorney, Agent, or Firm*—George R. Clark; Neil M. Rose

[57] ABSTRACT

A filter coffee machine mainly intended for domestic use is provided consisting of a unit which includes a filter and a water container. This unit is mountable on a coffee pot which is itself connected to an electric continuous flow heater which can also serve as a hot plate for the coffee pot. An outlet from the water container and a cold water feed pipe to the heater are detachably connected to each other and a heated water riser pipe is made up of an upper and a lower part detachably interconnected. It is preferred to have a closure for the lower pipe part which automatically closes when the said unit is removed from the coffee pot.

8 Claims, 7 Drawing Figures

FILTER COFFEE MACHINE

This invention relates to a filter coffee machine, particularly for domestic use and of the type including a filter, a water container, a coffee pot and an electrical continuous flow heater which at the same time acts as a hot plate.

Various forms of electrically heated filter coffee machines are known. Two different basic constructions can be distinguished in these known filter coffee machines. In one construction, the water container and coffee pot are mounted side by side. In this type of machine, a continuous flow heater may at the same time serve as a hotplate for the coffee pot. In operation heated water rises up a riser pipe and flows through a filter into the coffee pot. In order to pour the coffee, the pot has to be removed from the hotplate. In the other construction, the water container, filter, continuous flow heater and coffee pot are mounted one above the other. In this known type of coffee-making machine, either the coffee in the coffee pot cools off again even during the scalding process, as the continuous flow heater cannot serve as a hotplate, or a special hotplate is required. A particular disadvantage of both these types of coffee-making machine is the fact that they take up a great deal of room. One type requires a great deal of space in the horizontal plane, while the other type of machine is very tall.

It is one object of this invention to provide a domestic coffee machine which, as a result of compact construction, requires minimum storage space when not in use and the least possible space during operation, which can be used as a pot for keeping warm after the coffee making process has ended and wherein water can be added without special vessels.

According to the invention there is provided a filter coffee machine including a filter, a water container, a coffee pot and an electric continuous flow heater constructed to serve also as a hotplate wherein said filter and said water container form a unit, mountable on the coffee pot which is connected to the said heater, an outlet from the water container being detachably connected to a cold water gravity feed pipe to said heater, and a riser pipe for heated water from said heater comprising an upper and a lower part detachably connected to one another.

Preferably the lower part of said riser pipe has an entry aperture for the upper part thereof and an overflow channel extending between said lower part and the coffee pot is provided, means being provided whereby upon separation of said unit from the coffee pot an outlet from the water container and said entry aperture are automatically closed.

A closure device which can be actuated by means of a centering device mounted above the upper end of the lower part of the riser pipe is preferably provided. The said cold water gravity feed pipe and the lower part of the riser pipe are preferably mounted in the handle of the coffee pot. Finally, the continuous flow heater may be arranged to form the base of the coffee pot and the body of the coffee pot may be made replaceable.

In this way, it is ensured that a domestic coffee making machine according to this invention requires the minimum storage space when not in use and the least possible space during operation. To fill the water container, those parts of the coffee machine, namely the filter and water container, which form a unit are removed and the water container is filled with the necessary quantity of water from a water supply. After ground coffee has been put into the filter, the upper part of the coffee machine is replaced on the lower part.

The outlet of the water container and, at the same time, the entry aperture for the upper part of the riser pipe open automatically. After the coffee making process has ended, the upper part can be removed again, the outlet of the water container closes again automatically and at the same time the entry aperture for the upper part of the riser pipe is closed. Any water vapour occurring or residual water in the cold water gravity feed pipe and any possible condensation cannot now pass freely through the lower part of the standpipe to atmosphere but is passed via the overflow into the coffee pot, thus eliminating the possibility of scalding or otherwise contacting the user. In the dismantled state, the continuous flow heater serves only as a hotplate for the coffee pot. The upper part of the coffee machine can be stored compactly. The hotplate prevents the coffee from cooling. It is particularly advantageous if the base of the coffee pot is simultaneously formed by the continuous flow heater. This guarantees direct contact between the hotplate and the coffee in the pot. Moreover, for example, the casing of the pot can easily be replaced. It appears to be particularly advantageous if a glass casing for the pot is used. The way in which the glass casing of the pot and the continuous flow heater can be connected to one another forms no part of the invention and will not be further described.

Figure 2:
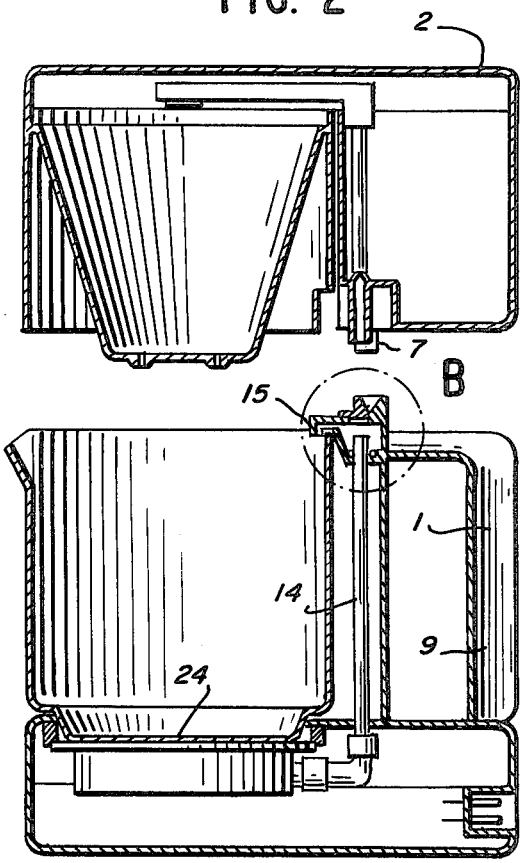
Figure 3:
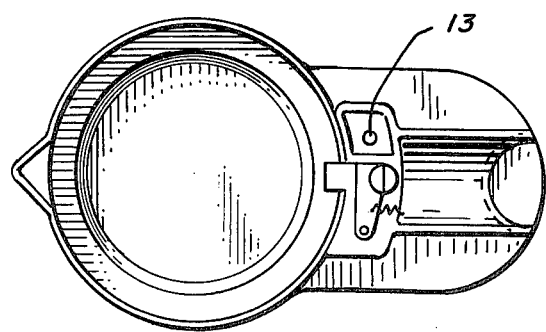
Figure 4:
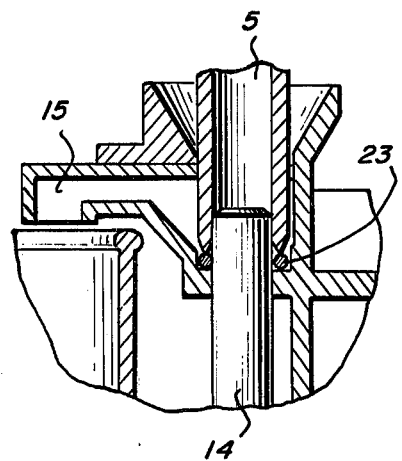
Figure 5:
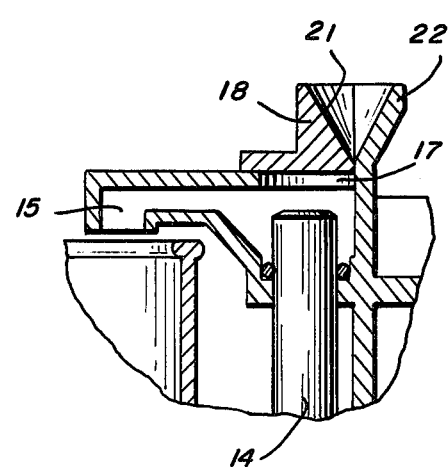
Figure 7:
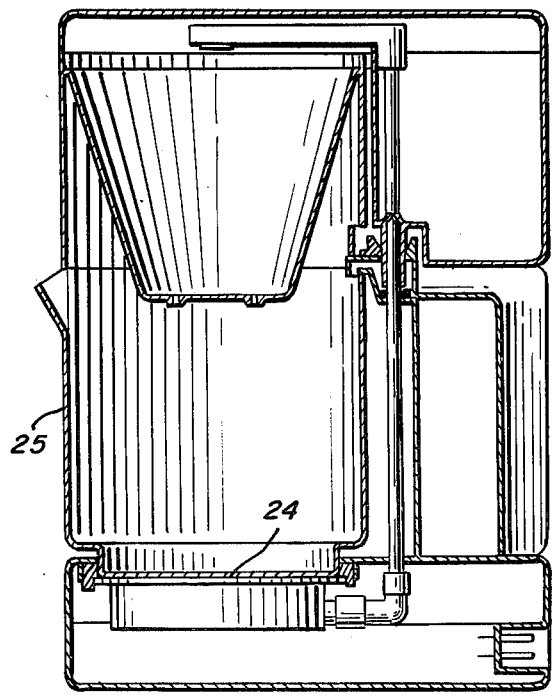
Figure 6:
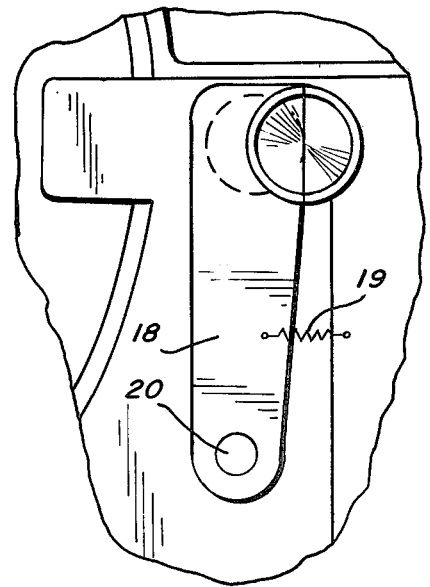

Two preferred embodiments by way of example of the invention will now be described with reference to the accompanying drawings in which:

FIG. 1 is a cross section through a coffee machine according to the invention with the upper part in position ready for use, FIG. 2 is a cross section with the upper part removed, FIG. 3 is a plan view of the lower part according to FIG. 2, FIG. 4 is a detail "A" of FIG. 1 in cross section and to an enlarged scale, FIG. 5 is a detail "B" of FIG. 2 in cross section and to an enlarged scale, FIG. 6 shows a plan view of detail B as shown in FIG. 5, FIG. 7 shows a similar view to FIG. 1 of another embodiment of the invention.

FIGS. 1 to 6 show diagrammatically one preferred embodiment by way of example of the invention. The coffee machine comprises a lower part 1 and an upper part 2, which are detachably connected to one another. The upper part 2 is constructed as a unit consisting of filter 3, water container 4, upper part of riser pipe 5, heated water outlet 6 and water container outlet 7. The lower part 1 consists of a stand 8 and a handle part 9 mounted thereon. In a recess in the stand 8 is provided a hotplate 10 for a coffee pot 11. Inside the stand 8 is mounted an electric continuous flow heater 12 in direct heat exchanging contact with the hotplate 10. The continuous flow heater 12 is connected to the water container 4 via a cold water gravity feed pipe 13 and to the heated water outlet 6 via a riser pipe which is formed of a lower part 14 and the upper part 5. The heated water outlet 6 is mounted over the filter 3. The lower part 14 of the riser pipe and the cold water gravity feed pipe 13 extend inside the handle part 9 and end at the upper end of the handle part. The lower part 14 of the riser pipe projects into an overflow channel 15, the opening 16 of which is mounted over the coffee pot 11. An entry aperture 17 for the upper part 5 of the riser pipe is provided, concentrically to the lower part 14 of the riser pipe, in the upper portion of the handle part 9. The entry aperture 17 is automatically closed by a closure device 18 when the upper part 2 is removed from the lower part 1 so that, when the coffee making process has ended, water vapour still leaving the lower part 14 of the riser pipe or any residual water still present in the cold water gravity feed pipe 13 is passed via the overflow channel 15 into the coffee pot 11. The outlet 7 of the water container is automatically opened and closed by a valve (not shown). In order to start the coffee making process, the upper part 2 with the water container 4 filled and ground coffee placed in the filter 3, is placed on the coffee pot 11. During this process, the closure device 18 is pivoted about a bolt 20 against the action of a spring 19, by the upper part 5 of the riser pipe, and the entry aperture 17 is opened. The pivoting movement of the closure device 18 is initiated by a cam surface 21 on the closure device 18 and a centering device 22 on the handle part. When the upper part 2 has been placed on the coffee pot 11, the upper part 5 of the riser pipe is detachably connected to the lower part 14 thereof and the cold water gravity feed pipe 13 is detachably connected to outlet 7 from the water container. A washer 23 is provided to seal the connection between the lower part 14 and upper part 5 of the riser pipe.

FIG. 7 shows another preferred embodiment of the invention, wherein the base 24 of the coffee pot is formed by the continuous flow heater 12 and the body 25 of the coffee pot is replaceable.

I claim:

1. A filter coffee machine including a coffee pot and an electric continuous flow heater constructed to serve also as a heating means for said coffee pot, a filter and a water container constructed as a unit being detachably mountable on said coffee pot, said water container having an outlet forming part of said detachable unit, a cold water gravity feed pipe attached at its lower end to said heater and detachably connected to said outlet at its upper end to circulate water from said container to said heater to continuously heat water flowing through said heater, and a riser pipe connected to deliver heated water from said heater to said filter comprising an upper part mounted on said unit and a lower part connected to said heater, said upper and lower parts being detachably connected to one another, an overflow channel at the upper end of said lower part of said riser to permit liquid to flow from the lower part of said riser to said coffee pot upon separation of said unit from said coffee pot.

2. A filter coffee machine according to claim 1, wherein lower part of said riser pipe has an entry aperture for the upper part thereof, means being provided whereby upon separation of said unit from the coffee pot said entry aperture is automatically closed.

3. A filter coffee machine according to claim 2, including a closure device mounted above the upper end of said lower part of the riser, pipe centering means being provided to facilitate the opening of said device upon insertion of said upper part into said entry aperture.

4. A filter coffee machine according to claim 2 wherein said coffee pot and heater comprise a separate assembly having a handle for use in pouring coffee from said pot, said cold water gravity feed pipe and the said lower part of the riser pipe are mounted in said handle.

5. A filter coffee machine according to claim 1, wherein the continuous flow heater forms the base of the coffee pot and the body thereof is replaceable.

6. A filter coffee machine comprising an upper assembly including a filter and a water container, a lower assembly including a coffee pot and an electric continuous flow heater constructed to serve also as a heater for the contents of said coffee pot, said heater having a cold water inlet and a hot water outlet included in said lower assembly, said upper assembly having an outlet from said water container which is detachably connected to said cold water inlet to deliver water from said container to said heater, said upper assembly having conduit means detachably connected to said hot water outlet to deliver heated water from said heater to said filter, said upper assembly being detachably mounted on said lower assembly so that when said upper and lower assemblies are assembled together, water from said container may be circulated by gravity to said heater where it is heated and forced upwardly into said filter, said heater being positioned so that brewed coffee which has passed through said filter into said coffee pot is heated by said heater, said lower assembly including a water bypass operatively connected to said hot water outlet when said upper and lower assemblies are detached to deliver heated water from said hot water outlet to said coffee pot.

7. The combination of claim 6 wherein said hot water outlet includes an upper end which is connectable directly to the lowr end of the conduit means in said upper assembly, said water bypass including a means defining a chamber within which said upper end and said lower end are positioned when connected together, said water bypass including an overflow channel to permit water to flow from said chamber to said coffee pot.

8. The combination of claim 7 wherein said water bypass includes an opening through which said conduit means on said upper assembly extends into said chamber, closure means for said opening, means biasing said closure means to a position closing said opening when said conduit means is removed from said opening.

* * * * *